United States Patent [19]

Hamilton

[11] Patent Number: 5,445,680
[45] Date of Patent: * Aug. 29, 1995

[54] METHOD OF DECORATING METAL SURFACES

[75] Inventor: C. Richard Hamilton, Arvada, Colo.

[73] Assignee: Golden Technologies Company, Inc., Golden, Colo.

[*] Notice: The portion of the term of this patent subsequent to Sep. 28, 2010 has been disclaimed.

[21] Appl. No.: 896,239

[22] Filed: Jun. 10, 1992

Related U.S. Application Data

[63] Continuation-in-part of Ser. No. 849,424, filed as PCT/US91/0931, Dec. 6, 1991, abandoned, which is a continuation of Ser. No. 624,140, Dec. 7, 1990, abandoned.

[51] Int. Cl.$^6$ .......................... B08B 3/08; B05D 3/06
[52] U.S. Cl. .......................... 134/26; 134/40; 427/327; 427/353
[58] Field of Search .......................... 427/327, 353; 413/1, 413/2, 8; 134/2, 10, 22.14, 22.19, 25.4, 26, 40; 252/162, 174.2, DIG. 14

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley et al. | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,540,505 | 9/1985 | Frazier | 252/106 |
| 4,599,116 | 7/1986 | King et al. | 134/2 |
| 4,620,937 | 11/1986 | Dellutri | 252/143 |
| 4,640,719 | 2/1987 | Hayes et al. | 134/40 |
| 4,654,089 | 3/1987 | Singelyn et al. | 134/26 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |

FOREIGN PATENT DOCUMENTS

| | | |
|---|---|---|
| 2636149 | 3/1977 | Germany . |
| 2713516 | 9/1978 | Germany . |
| 2026551 | 5/1978 | United Kingdom . |
| 1603047 | 11/1981 | United Kingdom . |
| 2143254 | 2/1985 | United Kingdom . |

*Primary Examiner*—R. Bruce Breneman
*Assistant Examiner*—Saeed T. Chaudhry
*Attorney, Agent, or Firm*—Sheridan Ross & McIntosh

[57] ABSTRACT

Disclosed is a method for decorating metal surfaces contaminated with water insoluble contaminants. The method prevents the formation of undesired etching and pitting of treated surfaces, thereby increasing reflectivity of such surfaces, increasing the mobility of articles treated by such method and decreasing the amount of surface coating required to achieve a desired coating thickness as compared to conventional treatment and coating methods. In one embodiment of the invention, contaminating oils present on the surface of metal containers are removed using a terpene finishing agent resulting in a metal surface roughness average of less than about 10.0 Ra.

19 Claims, 5 Drawing Sheets

METHOD OF DECORATING METAL SURFACES

REFERENCE TO RELATED APPLICATIONS

This application is a continuation-in-part of U.S. application Ser. No. 07/849,424 filed Dec. 6, 1991, now abandoned, which is a national phase of Patent Cooperation Treaty application Ser. No. 91/09310 filed Dec. 6, 1991 which is a continuation of U.S. application Ser. No. 07/624,140 filed Dec. 7, 1990 now abandoned. All of the preceding patent applications are incorporated herein by reference.

1. Field of the Invention

This invention relates to a method of decorating metal surfaces with decorative coatings or other finishes to economically improve the appearance of the metal surface, and more particularly relates to the reduction of etching of a metal surface so as to reduce the amount of decorative or protective coating required to coat said surface.

2. Background of the Invention

In numerous applications the coating of metal surfaces for decorative or protective purposes is desired. In particular, the coating of sheet metal used in the manufacture of various articles, such as automobiles, airplanes and appliance bodies, is typically accomplished by dipping or spraying such surfaces with a desired coating of paint, ink or other protective or decorative coating. Coated metal surfaces are particularly desired that are smooth, shiny and appealing to the eye of the consumer. To produce this effect, numerous layers of decorative and protective coatings are often required and primers are often used to pre-coat raw metal surfaces to fill in etches or grooves present on such surfaces as the result of sheet metal forming operations.

Prior to the application of a decorative or a protective coating to a metal surface, the surface must be sufficiently finished of any dirt or oils to permit proper bonding of the coating to the metal surface. Acidic or caustic finishing agents have typically been utilized to remove undesired oils and dirt particles from metal surfaces prior to application of a desired coating. Such agents, however, affect the surface of the metal, often etching the surface by reacting with the metal itself. For example, in the container finishing industry relatively strong acids, such as hydrochloric, hydrofluoric, sulfuric, phosphoric and nitric acids, are used to finish metal surfaces. U.S. Pat. No. Re. 32,661 by Binns discloses a method of finishing aluminum using an acidic aqueous finishing solution having a pH less than 2. Similarly, U.S. Pat. No. 3,969,135 by King discloses a composition and process for finishing aluminum using a low temperature aqueous acidic solution with a pH of less than 2.

The use of acidic and caustic agents in the finishing of metal containers also affects the mobility of containers conveyed in a contiguous manner on a production line by creating problems due to the friction created between the containers and between the container and conveying surfaces resulting from the etched container surfaces. Reduced mobility of the containers on high-capacity, high-speed production lines results in the jamming of processing machinery typically one to three times per hour in a typical container manufacturing facility. Such jamming necessitates the stopping of the production line and the manual extraction of containers which fall out of the production track and/or jams in the production machinery. The problem of production line container mobility has been recognized by those skilled in the art. For example, U.S. Pat. No. 4,599,116 by King et al. discloses a process for improving container mobility on a container processing line when containers are washed with an alkaline solution. This process, however, requires the addition of a conversion coating of chromium phosphate in order to obtain an "observed" improvement in mobility of the containers.

Finally, there is a continuing need in the container industry to improve the reflectivity and mirror-like appearance of the containers for decorative purposes. However, there have been no previous attempts to increase reflectivity of metal surfaces while maintaining effective adherence of a coating to a metal surface.

Thus, a method for decorating metal surfaces in a manner that would reduce etching and pitting of the metal surface is desirable. Moreover, given the environmental disposal problem associated with the use of acidic and caustic finishing agents, it would be desirable to have a method for finishing metal surfaces to be coated in such a way as to significantly reduce environmental concerns and that would preferably lend itself to a recyclable system.

SUMMARY OF THE INVENTION

The present invention is directed to a method of decorating metal surfaces in a manner that requires significantly less amounts of coatings to provide a desired decorative or protective finish. In accordance with the present invention, a metal surface to be decorated is contacted with a terpene-based finishing agent to remove any undesired oils or particulate matter from the surface of the metal. The terpene-based finishing agent effectively removes undesired oils and particulate matter without etching the surface of the metal, significantly reducing the surface area when compared with metal surfaces finished with acidic or caustic agents.

Multiple aspects of the decorating process are enhanced due to the resulting decrease in surface area. One aspect is the decrease in the amount of interior and exterior coating required for decorating a metal surface. There is a significant cost savings achieved by reducing the amount of coating used as well as a reduction in the amount of environmentally hazardous compounds released into the environment. The environmentally hazardous compounds are volatile organic compounds (VOCs) contained in the interior and exterior coating solutions.

In addition to the release of VOCs into the environment, other environmental problems exist with the use of acidic and caustic finishing agents such as disposal of the finishing agent after its use. These problems are alleviated by the use of a terpene-based finishing agent, which allows for the recyclability of contaminating oils removed from the metal surface, the terpene agent itself, as well as water utilized in the finishing and rinse stages of the process.

Another aspect is the increase in reflectivity of a metal surface finished with a terpene-based agent, rather than acidic or caustic agents, due to the absence of etching and pitting of the finished surface. The increase in reflectivity enhances the color of inks and paints applied to a metal surface. Such increased reflectivity and color enhancement of such metal surfaces increases the commercial appeal of items produced using the present process.

The present invention is particularly useful in the manufacturing of metal containers. A terpene-based finishing agent having a substantially neutral pH is used to remove lubricants and coolants applied during the manufacture of metal containers. The pH of the finishing agent used can range from about pH 6.0 to about pH 9.0 and preferably includes, as an active agent, a terpene such as d-limonene, alpha-terpineol, beta-terpineol, alpha-pinene, beta-pinene, alcohols of these compounds, or mixtures thereof. Preferably, a metal surface is contacted with from about 2 percent to about 40 percent by volume of a terpene-based finishing agent and rinsed with water to obtain a container having a roughness average (Ra) below about 5.0 Ra as measured on the outside diameter of the metal container and an Ra of below about 3.0 as measured on the inside diameter. Due to this reduced surface roughness, a method is provided for increasing both the reflectivity and the mobility of metal containers as well as reducing the number of pinholes in metal containers.

It has been unexpectedly found that the process of protecting and decorating metal surfaces is enhanced when the surfaces are finished in accordance with the present invention, as compared with metal surfaces finished using conventional acidic or caustic finishing agents.

DETAILED DESCRIPTION OF THE INVENTION

Figure 1:
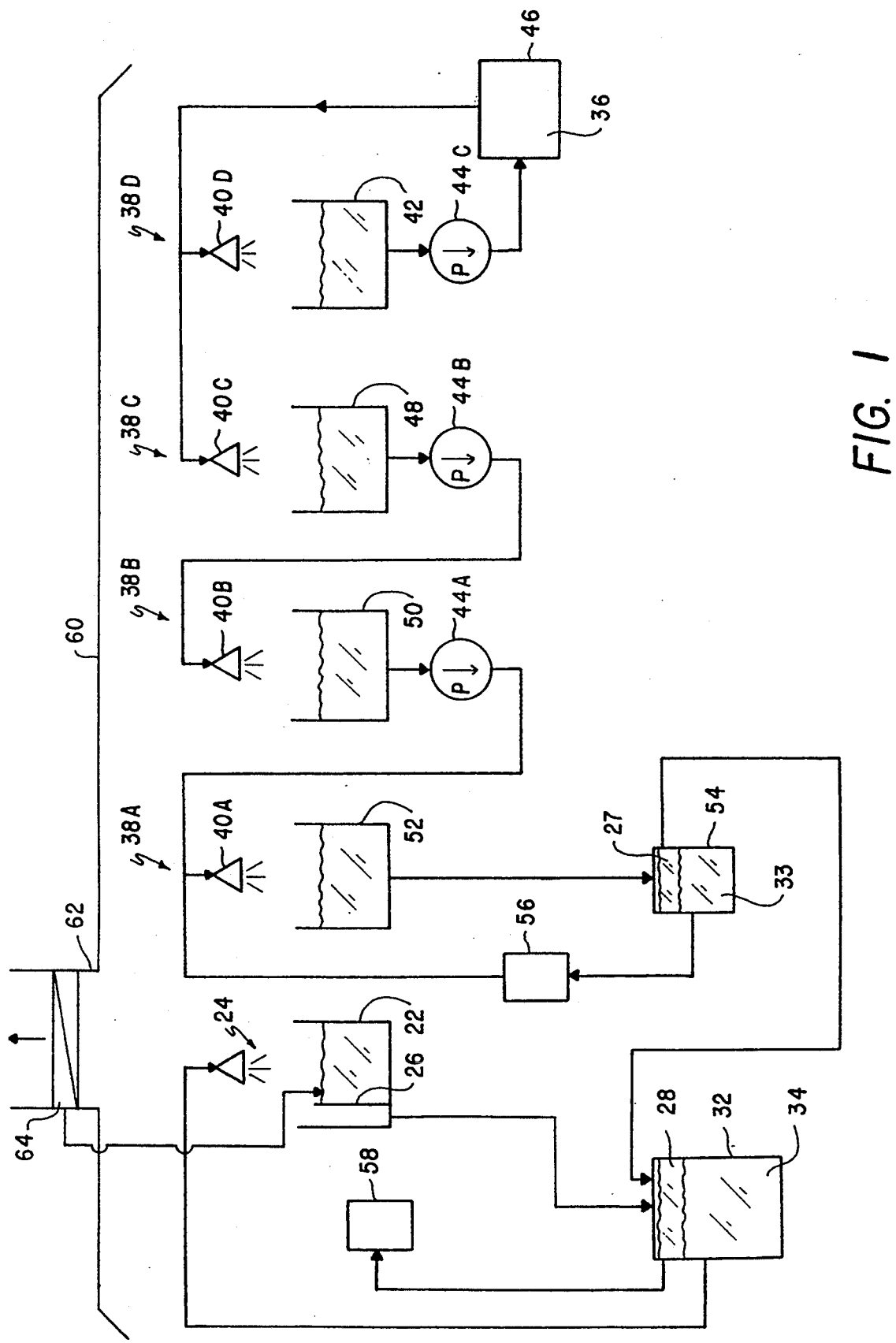
FIG. 1 is a schematic flow diagram showing the spray application of finishing agent and rinse water and the flow of fluids throughout the washing, rinsing and reclaim stages of the present invention.

The method of the present invention is for the finishing of any metal surface wherein the metal surface is finished and thereafter painted, exterior coated, interior coated, or otherwise decorated. In particular, the present invention includes a process for finishing metal surfaces by removing contaminating oils and metal fines from metal surfaces by contacting a substantially neutral pH finishing agent to the metal surface to remove undesired oils or particulate matter from the metal surface. Use of the present finishing process allows for reduced etching of metal surfaces when compared with acidic and caustic finishing treatments.

The present invention generally relates to a method for finishing metal surfaces, and in particular, surfaces of aluminum, steel, tin-free steel, brass, copper or alloys thereof, by contacting the metal surfaces with a terpene finishing agent. Such metal surfaces can include metal surfaces on, for example, automobiles, airplanes, railroad cars, metal components of high technology industries, computer and calculator faceplates, containers, precision metal parts, shiny metal components (e.g. doorknobs) and appliances. One preferred embodiment of the present invention involves the finishing of metal containers. The term container, as used herein, refers but is not limited to, beverage cans, food containers, and other containers such as aerosol cans and oil filters.

The present process and composition are particularly useful for articles having metal parts which are thin, such as metal parts which are less than about 0.010", more preferably less than about 0.0070", and even more preferably less than about 0.0040". Such thin metal parts, if etched by conventional acid or caustic wash solutions, can have holes etched completely through the metal parts. The present process and composition are also particularly suitable for use in conjunction with metals which are susceptible to etching by typical finishing solutions such as acidic or caustic washing solutions. In particular, aluminum, including treated aluminum, magnesium, including treated magnesium, tin-free steel, copper and copper alloys are particularly susceptible to etching. Further, the present process and composition are particularly suitable for use in finishing articles which are manufactured by any type of drawing process in which metal starting material is shaped by drawing the metal with various forming parts such as a die. Such drawn surfaces are particularly susceptible to etching because they may undergo gouging during the drawing process which provides a site for further acidic or caustic etching to occur.

Contaminants refers to any water insoluble organic substance, particularly a petroleum-based or synthetic organic compound, that is deposited on an article's surface during industrial processes. As used herein, water insoluble substances refer to any substance that is not dispersible in water at the molecular or ionic level. Such water insoluble substances are therefore not effectively removed from a surface by water. Contaminants typically will be lubricants and coolants, such as forming oils, cutting oils, mill oils, and anti-rust oils, which are commonly composed of petroleum products, esters, diesters and/or fatty acids. Preferred contaminants in the present invention are synthetic in origin including polyglycols, fatty acids, ethers including polyphenyl ethers, and esters including diesters, triesters and tetraesters and including phosphate esters, dibasic acid esters, silicate esters, and neopentyl polyol esters. Contaminants are commonly emulsions of an oil in water, typically having oil concentrations in the range of about 5 volume percent to about 25 volume percent. Metal coil stock for making metal articles, such as containers, for example, is frequently contacted with a number of compositions to lubricate the surface of the metal and to reduce the temperature in the metal.

Preferred contaminants are contaminants having a well-defined lower molecular weight value such that a molecular weight distribution of the contaminants does not go substantially below a given molecular weight. In this manner, effective filtration of system components can be achieved, as discussed below. Thus, preferred contaminants include synthetic oils having a well-defined molecular weight range or petroleum-based oils having a well-defined molecular weight fraction. In a preferred embodiment, the contaminant is an oil with a molecular weight of at least about 300 and more preferably above about 500. In a preferred embodiment of the invention, the contaminant comprises a petroleum fraction having a minimum chain length of 20 carbon atoms, more preferably a minimum chain length of 35 carbon atoms, and more preferably a minimum chain length of 50 carbon atoms. A preferred contaminant includes about 86 volume percent of a tetraester formed from the esterification of 30 carbon chain saturated fatty acids with pentaerythritol, 12 volume percent of surfactants and emulsifiers, and 2 volume percent of a rust inhibitor.

Contaminants having a low molecular weight or a broad molecular weight distribution including low molecular weight species can pass through the pores in certain filters, such as cross-flow filters resulting in poor filtration of water. In contrast, preferred contaminants having a well-defined lower molecular weight value greater than the relevant pore size typically will not pass through the pores in a filter. As used herein, cross-flow filter refers to a device which separates components in a pressurized feed stream moving parallel to a filter membrane. In cross-flow filtration, molecules below a desired size pass through the membrane walls. Molecules above a desired size are substantially incapable of passing through the membrane walls and pass through the filter.

The method of the present invention uses a terpene-containing composition or finishing agent having a substantially neutral pH to finish metal surfaces that effectively removes contaminants and other compounds deposited on metal surfaces during the manufacturing process. Such compositions having a substantially neutral pH are solutions which, given particular concentrations, amounts and finishing times, do not cause readily detectable etching of a container's surface. More particularly, such compositions have a pH of between about pH 6.0 and about pH 9.0, more preferably between about pH 6.0 and about pH 8.0, and most preferably between about pH 6.5 and about pH 7.5. The terpene active agent of the finishing agent is hydrophobic and, as such, can be readily separated from water and recycled for further use.

Terpenes have the general chemical formula of $C_{10}H_{16}$ and are based on the isoprene unit $C_5H_8$. The term terpene includes terpene derivatives or terpenoids as well as monocylcic, bicyclic, polycyclic or acyclic terpenes. Preferred terpene compositions of the present invention include d-limonene, alpha-terpineol, beta-terpineol, alpha-pinene, beta-pinene, alcohols of such compositions, or mixtures thereof.

The concentration of a terpene used in a particular case depends upon the amount and type of contaminants being removed, the method of application and various other factors. In a preferred embodiment of the finishing agent, terpene is combined with water at concentrations from about 1.86 volume percent to about 37.2 volume percent, more preferably from about 4.65 volume percent to about 27.9 volume percent and most preferably from about 9.3 volume percent to about 23.25 volume percent, based on the total volume of the finishing agent.

In one embodiment of the invention, surfactants are used in conjunction with the terpene to facilitate rapid wetting of the surface of the metal containers and for emulsification of organic components. Surfactants may be added to the finishing agent to enhance the solubility of the terpene in the aqueous medium, or surfactants can be separately contacted to the metal surface. Any suitable surfactant or mixtures of surfactants can be used and can be of the non-ionic, anionic, cationic or amphoteric type, and of natural or synthetic origin. Suitable surfactants for use in the present invention include, but are not limited to, nonylphenol, alkanolamide, (nonylphenoxy) polyethylene oxide, sodium salts of petroleum sulfonic acid, sorbitan sesquioleate and mixtures thereof. Specific suitable surfactants include surfactants sold under the commercial designation Tergitol NP-7 sold by Union Carbide Corporation and WRS-1-66 sold by Cycle-Corporation of Miami, Fla. Tergitol NP-7 is a non-ionic nonylphenol with an ethoxylated seven carbon chain. WRS-1-66 is a non-ionic alkaynol-amide consisting of oleic acid DEA and DEA oleate.

The concentration of surfactant used is such as to achieve a stable aqueous solution of the terpene and water, an acceptable finishing of articles, and an acceptable separation of contaminants from the aqueous solution, as discussed below. Typically, the concentration of surfactant in the composition is between about 0.14 volume percent and about 2.8 volume percent, more preferably between about 0.35 volume percent and about 2.1 volume percent, and more preferably between about 0.7 volume percent and about 1.75 volume percent based on total volume of the aqueous solution. In a preferred embodiment, the composition includes Tergitol NP-7 or a similar composition in a concentration of between about 0.12 volume percent and about 2.4 volume percent based on total volume of the aqueous solution, and WRS-1-66 or a similar composition in a concentration of between about 0.02 volume percent and about 0.4 volume percent based on total volume of the aqueous solution.

A further characteristic of the present invention is the ratio of surfactant to terpene in the aqueous solution. This ratio is a measure of the stability of the terpene and water emulsion in the aqueous solution and the ability of the aqueous solution to allow contaminants to separate after finishing. Typically the ratio of surfactant to terpene is less than about 9.5:90.5, more preferably between about 5:95 and about 8:92, and most preferably about 7:93.

The aqueous solution, in addition to terpene and surfactant, also includes water as the continuous phase. Typically, water is present in amounts between about 60 volume percent and about 98 volume percent, more preferably between about 70 volume percent and about 95 volume percent, and more preferably between about 75 volume percent and about 90 volume percent.

The terpene finishing agent may be contacted with the metal surface by spraying the finishing agent onto the metal surface, by immersing the metal surface in the finishing agent, or by any other suitable means.

Many of the significant problems associated with conventional methods of finishing metal surfaces with acidic or caustic finishing agents are eliminated by use of the present invention. Use of a substantially neutral pH finishing agent allows for the removal of contaminants, specifically lubricants and coolants, from metal surfaces without the etching associated with conventional acidic or caustic finishing agents. The decrease in etching reduces the amount of interior and exterior coatings necessary to sufficiently coat the surface, and may increase the strength of the metal sufficiently to allow for a reduction in the thickness of the metal. In the absence of etching, the surface of a metal is smoother, thus enhancing the light reflective qualities of the metal surface and increasing the mobility of metal containers conveyed in a contiguous manner.

The present invention is also advantageous because it eliminates the use of dangerous acidic or caustic solutions that pose serious risks to employees performing metal container finishing procedures. Terpenes, contaminants and water used in the process can be collected and the different components can be separated from each other and reused in the metal finishing process.

In one embodiment of the present invention, metal containers are finished as part of a continuous process for stamping, forming, ironing, doming, finishing and decorating metal containers. Such a continuous process can include, for example, stamping a circular piece of aluminum from a roll of sheet aluminum and forming the circular piece into a cup-like configuration. The process further includes elongating the container sides by use of one or more ironing dies to form the container to a desired height and final configuration. The bottom of the container can be domed to produce a concave bottom surface of the final container. The containers are then finished, for example, by the present process, to remove oils applied to the container during the forming process. The finished containers can then be decorated by various known printing techniques. Such containers can then be filled, for example, with beverages or foods and sealed with a top.

The present invention includes the finishing of metal containers in the above-described container production process in a washer by applying the terpene finishing agent of the present invention on the metal containers as they are conveyed through the process. For example, containers can be conveyed on a large mesh conveyor, in an open-end down manner, with sprays directed from the top and bottom so that sprays contact all surfaces of the container. Subsequently, the containers are rinsed with water. The containers are then dried, typically, with an oven dryer.

Typically, when the oils are removed from the surface of a metal with an acid wash, the acid removes not only the oils, but also the top layer of the metal. Specifically, in the instance of aluminum beverage containers, the aluminum is oxidized by the acid to form an aluminum oxide layer. The oxidation creates etches and pits in the metal surface.

The absence of etching and pitting of the metal surface obtained by finishing metal surfaces according to the method of the present invention results in improved reflectivity of the surface of the metal due to the reduced roughness of the surface of the metal. The improved reflectivity has an attendant aesthetic advantage of providing a shinier surface of the metal, improving appearance of the coating applied to the surface of the metal and adding "eye appeal" to the ultimate consumer. For example, Example V visually illustrates an aluminum container treated in accordance with the present invention as compared to an aluminum container treated with an acid wash.

One measure of the smooth surface obtained from the use of the present invention is the roughness average of the metal surface. Referring to Table 1, the roughness average of the outside diameter of a metal container finished according to the present invention is less than about 5.0 Ra and preferably less than about 4.0 Ra, and most preferably less than about 3.0 Ra, wherein Ra is defined as the arithmetic mean of the departures of the profile produced by a profilometer from the mean line. The roughness average of the inside diameter of a metal container finished according to the present invention is less than about 10.0, and preferably less than about 8.0 Ra, and most preferably less than about 6.0 Ra.

The absence of etching and pitting of a metal surface is particularly useful in the production of metal parts which are thin, such as metal parts which are less than about 0.010", more preferably less than about 0.0070", and even more preferably less than about 0.0040". Such thin metal parts (e.g., metal containers), if etched by conventional acid or caustic wash solutions, can have holes etched completely through the metal parts at susceptible locations, such holes rendering the container useless.

Another advantage of the present process is that due to a reduction in pitting and etching, there is less friction between metal articles conveyed in a contiguous manner and therefore better mobility of metal articles on production lines. Referring to Table 2, the mobility of metal articles treated according to the present method can typically be improved by above about 15%, more preferably above about 20%, and even more preferably by above about 30%. Mobility can be measured, for example, by counting the number of times an article jams on a production line because of friction between articles. By using the present method, the mobility of metal containers can be increased by greater than 22%. Consequently, less frequent jamming of the production line is experienced and fewer, if any, stoppages of the manufacturing machinery during production of metal containers is required.

After a metal surface is finished according to the present invention it may be painted and/or exterior coated with protective or decorative coatings as are generally known in the industry. In the instance of beverage and food containers, the inside of the container may be lined with a protective coating, or internal coat, to prevent the beverage or food from coming into contact with the metal container. It has been unexpectedly found that metal surfaces finished by the process of the present invention require less ink, exterior coat and interior coat to obtain acceptable coatings at desired coating thicknesses. Without intending to be bound by theory, it is believed that a reduced amount of ink, exterior coat or interior coat is achieved because, in the absence of etching and pitting of the surface of a metal, there is a reduction in the total metal surface area to be coated. As such, a reduced quantity of ink, exterior coat or interior coat is required to finish the metal surface. The decorative and protective coatings that may be applied to metal surfaces finished in accordance with the present invention include, but are not limited to, ink, paint and plastic.

For example, in a preferred embodiment, an appropriate design of viscous ink solution is rolled onto a rubber blanket that transfers the ink to the exterior surface of the metal container. A less viscous exterior coat is then rolled over the wet ink after which the coatings are cured using ultraviolet light.

In one embodiment of the present invention, the exterior coat consists of acrylic latex monomers and photoinitiators. The amount of exterior coat required to obtain a desired thickness of exterior coating on a 16 oz. container having a diameter of about 62 mm is less than about 190 milligrams (mg) of exterior coat/container, and preferably less than about 140 mg of exterior coat/container, and most preferably less than about 120 mg of exterior coat/container. When comparing containers coated after being treated with acid or caustic finishing agents, this represents about a 37% decrease in the amount of exterior coating required.

An effective amount of interior coating can also be applied to the interior surface of a container to protect the contents of the container from the metal surface. Interior coatings typically include epoxy-based coatings. In one embodiment of the present invention, the amount of interior coat required to sufficiently coat the interior surface of metal containers to a desired thickness is significantly reduced. Containers (16 oz.) finished according to the present invention is less than about 165 mg of interior coat/container, and preferably less than about 145 mg of interior coat/container, and most preferably less than about 135 mg of interior coat/container. As compared to containers treated with acid or caustic finishing agents, this represents about an 18% decrease in the amount of interior coat required to coat such containers.

In the coating of metal surfaces, coatings are applied in desired thicknesses to achieve various goals. For example, decorative coatings can be applied at thicknesses to achieve a desired color. Protective coatings on the outside of a container may be applied to a desired thickness to protect underlying decorations from scratching. Interior coating for food and beverage containers may be applied to a desired thickness to act as a barrier between the metal container and the food or beverage. The present invention, by reducing the etching of a surface during finishing, reduces the surface area to be coated, and thus reduces the amount of coating necessary to coat a metal surface to a desired thickness.

A sufficient coating thickness for the interior of containers must also be applied consistently over a given surface area. The consistency of coating coverage is typically determined by an acceptable enamel rating reader (ERR) value. ERR values are used to determine the integrity of coatings by assessing the ability of a coated container to conduct an electrical current. Adequately coated containers conduct little if any current. An acceptable ERR value of less than 10 milliamps (ma), and more preferably less than 5 ma, indicates the absence of discontinuous coating on the interior surface of the container. In one embodiment of the present invention, the interior surfaces of the metal containers finished according to the method of the present invention are sufficiently coated as determined by ERR. Referring to Table 4, a 37% decrease in the amount of exterior coating used and an 18% decrease in the amount of interior coating used, sufficiently coated containers treated according to the present invention.

It has been previously believed in the art to be advantageous to use acid washes because by doing so a metal surface would be etched, thus affording a sufficiently roughened surface to which inks, exterior coats or interior coats could properly adhere. However, it has been unexpectedly found that inks, exterior coats and interior coats applied to metal surfaces finished in accordance with the method of the present invention, adhere in as good a fashion or better, when compared to painted and coated metal surfaces finished with an acid wash.

The reduced amount of ink, overcoat and internal coat required translates into significant cost savings. The reduction in ink and other coatings also reduces the amount of ink and coatings that must be removed during recycling operations. Therefore, substantial reductions in potentially toxic fumes and environmentally damaging residues may be achieved through use of the method of the present invention.

A significant benefit achieved by the present invention relates to the recyclability of the finishing agents, water and removed oil attendant to the process. In conventional metal finishing processes acidic and caustic washes are difficult to handle and to dispose of. In contrast, the terpene finishing agent used in the method of the present invention is non-hazardous, poses no dangers to workers on the production line, and is environmentally safe.

In one embodiment of the present invention as depicted in FIG. 1, the method is directed to the finishing of metal containers using a terpene finishing agent. Metal containers having oils on their surfaces are conveyed above a washer reservoir 22 and are sprayed with a terpene finishing agent 24. The oils and terpene finishing agent 24 flowing off of the containers during spraying are collected in the washer reservoir 22. The oil and wash solution mixture can be directed to a settling tank 32. In the settling tank 32, an insoluble phase 28 containing the contaminant oils is allowed to separate from an aqueous phase 34. The insoluble phase floats above the water phase allowing for efficient separation of the two phases. The oils can then be reused in the metal container manufacturing operation or disposed of. The separated finishing agent can be collected and reused in the above-described spraying process to remove further oils from additional metal containers. Thus, the present invention provides for an essentially closed loop with respect to the terpene finishing agent. Addition of finishing agent and surfactant to the washer reservoir is only necessary to replenish that loss caused by evaporation and by adherence of solution to metal containers being conveyed through the washing process.

After being conveyed through the washer reservoir 22, the metal containers are then further conveyed through successive rinse stages 38 A, B, C and D where they are repeatedly sprayed with water to remove remaining traces of terpene finishing agent and oils present on the metal containers. A preferred embodiment of the rinsing process includes four rinsing stages 38 A, B, C and D. Metal containers are rinsed successively by each of the four stages. Rinse water is cycled through the first three 38 A, B and C of the four stages for reuse in prior rinse stages. Clean deionized water 36 is used as rinse water in the fourth and final rinse stage 38D, to remove all remaining traces of the above-identified components as well as minerals found in plant process water.

For ease of explanation, the following description of the rinsing process begins with the final stage 38D of the rinsing process and subsequently discusses the other three prior rinse stages 38 A, B, C and D in order to correspond to the direction of the flow of water in the process, which is opposite to the direction in which containers are conveyed. In the fourth rinse stage 38D, metal containers are sprayed with deionized water 36 directed through spray head 40D to remove any residual oils, or terpene finishing agent. The rinse water from the fourth rinse stage 38D is collected in a fourth stage reservoir 42. The rinse water from the fourth stage 38D is reused by directing it from the fourth stage reservoir 42, through a pump 44C and then through a deionizer 46 for further use in the fourth stage rinse 38D. Deionized water 36 is thus regenerated without the necessity of continuously adding new deionized water from outside of the system. Water loss caused by evaporation or by the adherence of water to the metal containers exiting the fourth rinsing stage 38D is compensated for by the addition of relatively small amounts of additional deionized water 36.

In one embodiment, the rinse water used in the third rinse stage 38C is also deionized water 36. In this embodiment, deionized water 36 is directed from the deionizer 46 used in the fourth stage 38D to the third spray head 40C. Alternatively, tap water can be used as rinse water in the third stage (not shown). The rinse water from the third stage is drained into the third stage reservoir 48, and subsequently conveyed by a pump 44B to the spray head 40B for the second stage rinse 38B.

After water is sprayed from the spray head 40B in the second stage rinse 38B, it drains into the second stage reservoir 50. Water is taken from the second stage reservoir 50 and subsequently conveyed to a pump 44A to the spray head 40A for the first rinse stage 38A. After water is sprayed from the spray head 40A in the first stage rinse 38A, it drains in to the first stage reservoir 52.

Water from the first stage rinse 38A is collected in the first stage reservoir 52 and is recycled for use as rinse water for the first rinse stage 38A. Thus, the first rinse stage 38A is supplied with rinse water from both the first 52 and second 50 stage reservoirs. Recycling of the first stage rinse water is accomplished by use of a separator reservoir 54. Rinse water from the first stage reservoir 52 is directed to the separator reservoir 54 to allow finishing agents and oils 28 to separate from the aqueous water phase 33 of the resulting rinse solution. The oils 28 can then be directed to the settling tank 32. The aqueous phase 33 is conducted through a filter 56 to remove any remaining oils and is then returned for further use in first stage rinsing 38A of additional metal containers. Thus, in one embodiment of the invention, the water used in the washer reservoir 22 and the water used in the rinsing process, is continuously recycled for use in the washing and rinsing of metal containers. The only additional water supplied to the system is deionized water 36 furnished from outside the system.

The combined flow rate of rinse water in the four rinse stages 38 A, B, C and D is preferably sufficient to completely rinse finishing agent and oils from the metal containers. The amount of water used in each stage is preferably kept to a minimum in order to conserve water while at the same time thoroughly rinsing the metal containers.

After the third rinsing stage 38C, all terpene finishing agent and oils are rinsed from the metal containers and only deionized or tap water is on the metal containers. The fourth rinsing stage 38D rinses all water from the metal containers with deionized water 36. An acceptable flow rate and rinsing time in the fourth rinsing stage 38D to completely rinse water from the metal containers can be determined by experience. It should be appreciated that while use of various volumes of rinsing water may be used, the minimum amount of water necessary to obtain complete rinsing should be used to minimize process time and water use.

Between rinsing stages 38 A, B, C, and D or after the final rinse 38D, blowers (not shown) can be used to blow residual water from the containers. Containers can then be subsequently dried in ovens or other conventional drying or heating devices.

In conjunction with the present invention, a stack condenser can be used to control the amount of volatile organic compounds released during the finishing and coating processes. Referring to FIG. 1, in a preferred embodiment, terpene emissions are captured in a hood 60 which covers the entire washing and rinsing stages of the finishing process. The emissions are condensed by a stack condenser 64 placed within an exhaust stack 62 at about 60° F., at a flow rate of about 250 ft$^3$/minute. Thus, the VOC emissions produced by the use of terpene can be reduced by at least about 90% and more preferably by at least about 99%.

The following examples and test results are provided for purposes of illustration and are not intended to limit the scope of the invention.

EXAMPLE I

This Example compares containers washed with a standard acid wash to containers washed according to the present invention with respect to the roughness average of the surfaces of the containers. The containers washed in accordance with the present invention have a smoother surface with increased reflectivity as indicated by measurements of roughness. Table 1 below compares the average roughness of containers washed in accordance with the present invention and containers washed using a standard acid wash. Two aluminum containers were analyzed by a scanning electron microscope and a Rank Taylor Hobson Profilometer to determine the difference in surface roughness of the outside and inside diameters of each container.

A 10 volume percent terpene composition was used in which the finishing agent included 93 volume percent d-limonene, 6 volume percent Tergitol NP-7 and 1 volume percent WRS-1-66. The containers were cleaned using the process described below in Example V. A roughness average is the universally recognized and most used international parameter of the roughness of a surface. A roughness average is the arithmetic mean of the departures of the profile line produced by a profilometer from the mean line given by the following equation.

$$Ra = 1/L_0 \int^L y(x)/dx \qquad [1]$$

where L = measurement length
$_0\int^L$ = integral from 0 to L
y = peak heights
x = period of integration

TABLE 1

COMPARISON OF Ra VALUES BETWEEN ACID AND TERPENE WASHED CONTAINERS

| Wash | Roughness Average |
|---|---|
| Terpene Composition Wash | (Inside Diameter) 5.6 Ra |
| Acid Wash | (Inside Diameter) 12.5 Ra |
| Terpene Composition Wash | (Outside Diameter) 2.2 Ra |
| Acid Wash | (Outside Diameter) 6.0 Ra |

Table 1 indicates that containers washed with the terpene finishing agent produce a container about two to three times smoother than containers washed in a standard acid wash.

EXAMPLE II

This Example compares the relative mobility of containers processed by the method of the present invention and those processed using acidic agents. Aluminum containers were treated in accordance with the method set forth in Example V and other containers were treated with a conventional acid wash comprising 37 percent by volume sulfuric and hydrofluoric acid. The containers were dried and then tested for mobility. Three containers that had been treated in the same manner were laid on their sides, two side by side and one above and between the two, on a balance board. The board was then tilted upward until a point where the top container became mobile and started to slide off the bottom two containers. The maximum slope that can be measured in this test apparatus is 42°. Twenty-four comparative tests were done. The average slope for containers treated with terpene finishing agent was 31.7°. In comparison, the average slope for containers treated with acid agents was greater than 42°. Thus, treatment of containers with terpene increased their mobility by at least 22%.

TABLE 2

MOBILITY OF TERPENE COMPOUND WITH ACID WASHED CONTAINERS

| ACID WASH | TERPENE WASH |
| --- | --- |
| 42° | 25° |
| 42° | 30° |
| 42° | 40° |
| 42° | 22° |
| 42° | 18° |
| 42° | 35° |
| 42° | 28° |
| 42° | 34° |
| 42° | 23° |
| 42° | 18° |
| 42° | 32° |
| 42° | 31° |
| 42° | 37° |
| 42° | 21° |
| 42° | 36° |
| 42° | 19° |
| 42° | 27° |
| 42° | 30° |
| 42° | 41° |
| 42° | 40° |
| 42° | 28° |
| 42° | 41° |
| 42° | 35° |
| 42° | 29° |
| AVERAGE 42° | AVERAGE 31.7° |

EXAMPLE III

A test was performed to compare the amounts of interior and exterior coating required to sufficiently coat the inner and outer surfaces, respectively, of metal containers washed with a standard acid wash and metal containers washed with the terpene finishing agent described in Example V. About 60,000 containers were washed and coated in accordance with the present invention and the average weight of coating required to attain sufficient coverage (i.e. visually equivalent tone and color to those containers treated with a standard acid wash) was recorded. The results are shown in Table 3.

TABLLE 3

COMPARISON COATING AMOUNTS USED ON ACID AND TERPENE WASHED CONTAINERS

| | Terpene Wash Average Coating (mg/container) | Acid Wash Average Coating (mg/container) |
| --- | --- | --- |
| Exterior Coat (Ink + Exterior Coat) | 122 | 190 |

TABLLE 3-continued

COMPARISON COATING AMOUNTS USED ON ACID AND TERPENE WASHED CONTAINERS

| | Terpene Wash Average Coating (mg/container) | Acid Wash Average Coating (mg/container) |
| --- | --- | --- |
| Interior Coat | 135 | 165 |

As demonstrated by these results, there is a significant reduction in the amount of interior and exterior coat required to coat a container washed with a terpene finishing agent compared with a container washed with an acid wash. It was found that 37% less exterior coat was required and 18% less interior coat was required to coat containers treated with a terpene finishing agent compared with those treated with an acid wash.

EXAMPLE IV

A comparative test run was conducted to study different parameters typically used to evaluate the efficiency and quality of container coatings. The test compared aluminum beverage containers finished with an acid wash and aluminum beverage containers finished with a terpene finishing agent according to the method described in Example V and coated in accordance with the present invention. Sixty thousand containers were finished in accordance with the present method to obtain the results set forth in Table 4 below.

TABLE 4

COMPARISON OF COATING QUALITIES BETWEEN ACID AND TERPENE WASHED CONTAINERS

| Parameter Tested | Containers Finished With Acid Wash | Containers Finished With Terpene Finishing Agent |
| --- | --- | --- |
| ERR (enamel rater reading) | Okay | Okay |
| Ink Color | Okay | Okay |
| Container Approximate cleanliness (visual measure) | standard | standard |
| 1) with first stage hot water rinse on | -- | dark appearance |
| 2) with first stage hot water rinse off | standard | standard |

As demonstrated by these results, the integrity of the interior coatings between the acid and terpene treated containers are equivalent despite the decrease in amounts of coatings used on terpene-finished containers (see Table 3). In addition, these results indicate that the ink color as well as the cleanliness of the terpene treated containers are equivalent to the acid treated containers. The dark appearance of the inside of containers cleaned by the method described in Example V is thought to be caused by the absence of etched surfaces having the ability to scatter light, making rougher surfaces appear lighter in appearance and smoother surfaces appear darker in appearance.

EXAMPLE V

A photograph (FIG. 2) and a representative drawing (FIG. 3) are provided as a visual comparison of metal containers washed with the solution described in Table 5 below and containers washed with an acid-containing agent. A testing apparatus was provided in which an aluminum container is held in an upside-down orientation. One spray nozzle is directed at the top of the container and a second nozzle is directed at the bottom. The finishing agent identified below in Table 5 is sprayed through both nozzles at an aluminum container having lubricants and coolants on it for a period of 55 seconds. The container is then rinsed in a first rinsing tank containing water with physical agitation. The container is then removed and placed in a second rinsing tank containing water with physical agitation. The container is then rinsed in a third rinsing tank containing water with physical agitation and subsequently dried. The total rinsing time was approximately 55 seconds.

TABLE 5

| COMPOSITION OF TERPENE FINISHING AGENT | |
|---|---|
| Ingredient | Percentage by Volume |
| d-limonene | 9.28 |
| Tergitol NP-7 | 0.63 |
| WRS-1-66 | 0.09 |
| Water | 90.0 |

Figures 2A, 2B:
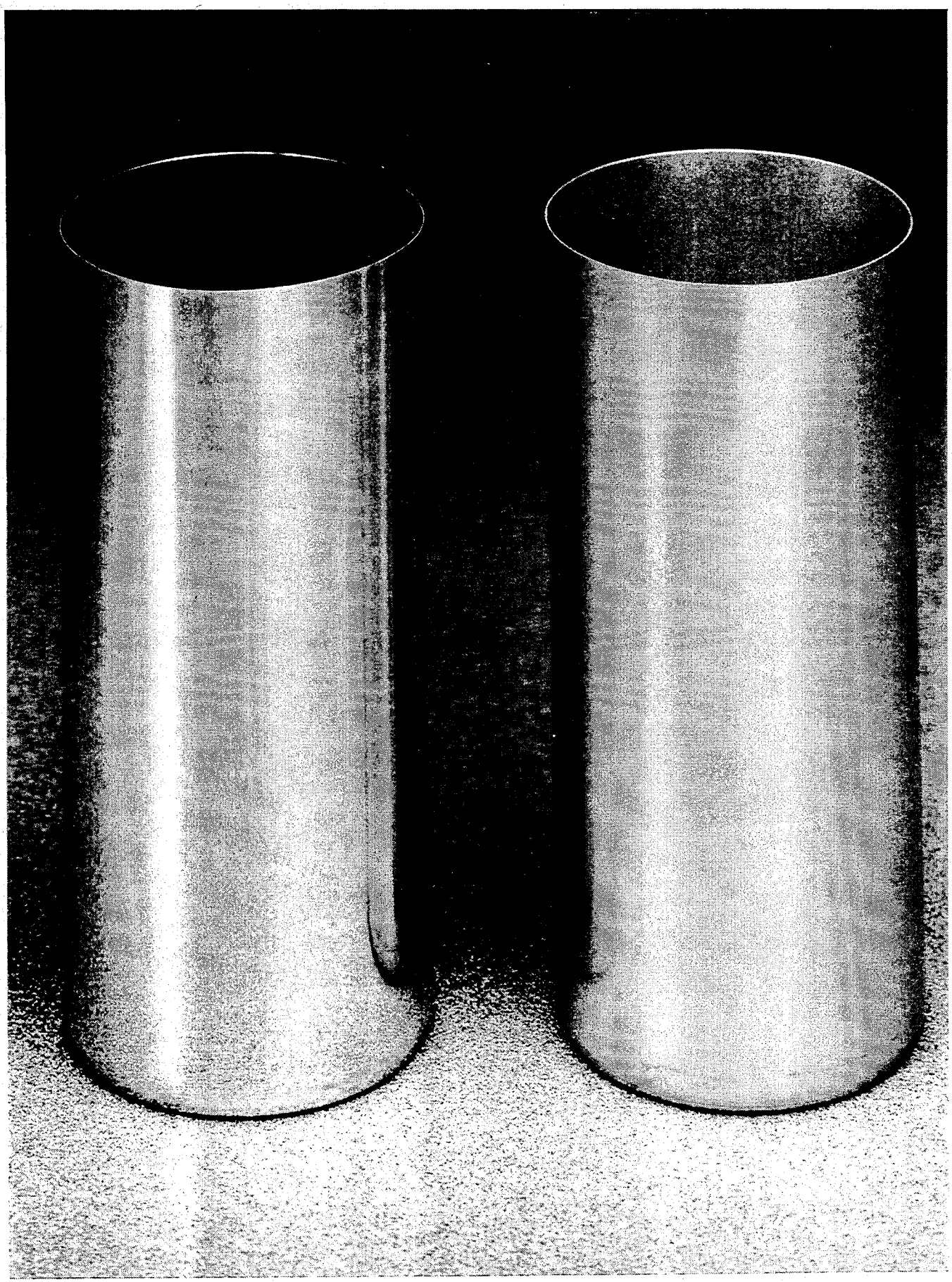
FIG. 2a is a photograph showing an aluminum container washed according to the present invention.
FIG. 2b is a photograph showing an aluminum container washed by a standard acid wash.
Figure 3B:
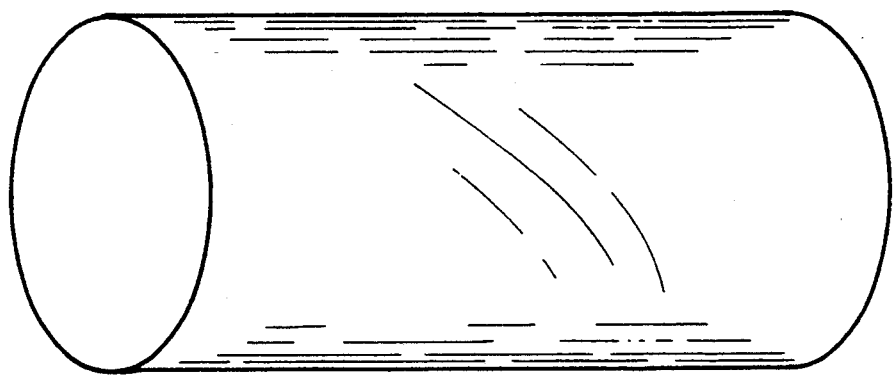
FIG. 3b is a drawing representing an aluminum container washed according to the present invention.
Figure 3A:
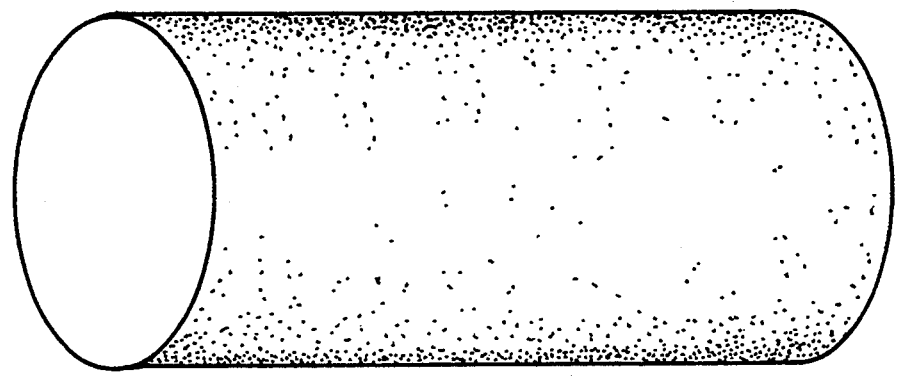
FIG. 3a is a drawing representing an aluminum container washed by a standard acid wash.

FIG. 2 shows a photographic comparison and FIG. 3 shows a schematic drawings for comparison of an aluminum container cleaned in the above described manner with an aluminum container cleaned by traditional acid cleaning process using an acid wash comprising 37 percent by volume sulfuric and hydrofluoric acid and a surfactant. Both containers were formed by an identical process and contained the same lubricants and coolants on their outer surfaces prior to cleaning. As can be seen, the container cleaned by the present process has a shiny, highly reflective surface, while the acid wash container has a much duller, smokey appearance.

EXAMPLE VI

Figure 4A:
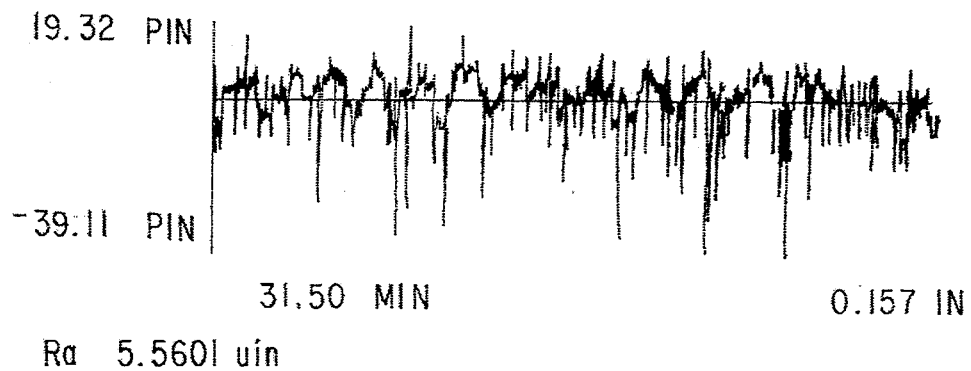
FIG. 4a is a graphic profile of the roughness average of the surface of an aluminum container washed according to the present invention.
Figure 4B:
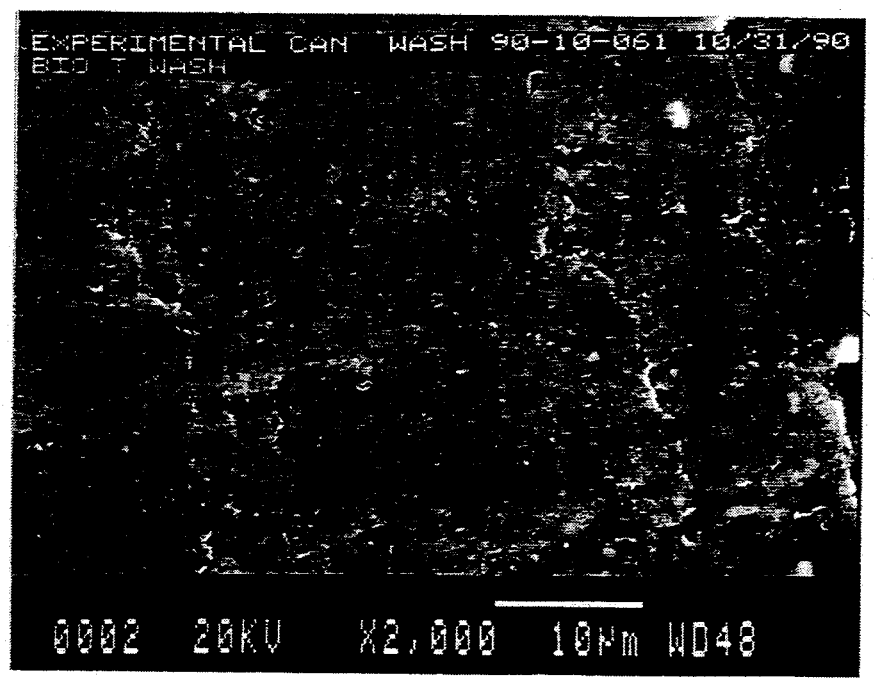
FIG. 4b is an electron micrograph of the surface of an aluminum container washed according to the present invention.
Figure 5A:
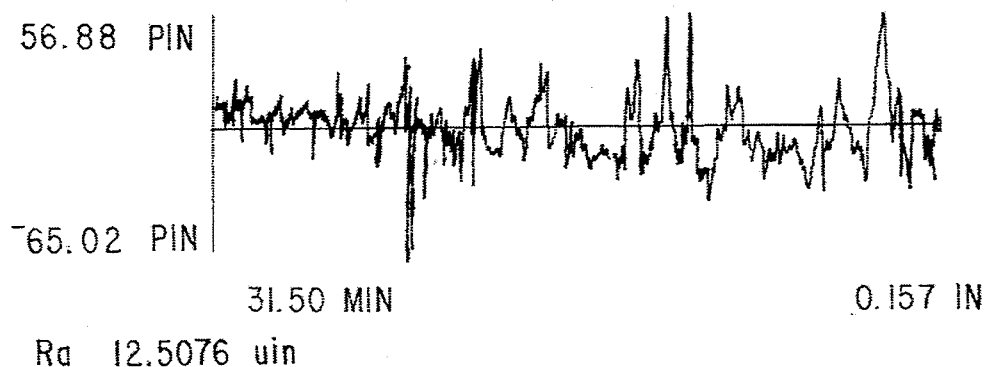
FIG. 5a is a graphic profile of the roughness average of the surface of an aluminum container washed by a standard acid wash.
Figure 5B:
FIG. 5b is an electron micrograph of the surface of an aluminum container washed by a standard acid wash.

A comparative examination of the surface of aluminum containers cleaned by the present process and by a standard acid wash was conducted by taking electron micrographs of the metal container surfaces after washing. The container washed in accordance with the present invention was cleaned according to the process described in Example V. A resulting electron micrograph at magnification of 500× is shown in FIG. 4. A container washed by standard acid wash, as described in Example VI, is shown in FIG. 5. Comparisons of the containers finished by the present process and the acid wash shows that the container finished with a d-limonene finishing agent has a much smoother surface, while the acid wash container has deeper pits and a scratched appearance. The difference in these surfaces accounts for many advantages of the present process, including a shiny appearance and better ink or paint adhesion.

EXAMPLE VII

This example illustrates that a metal surface finished in accordance with the present invention and that is coated with typical inks and an exterior coating meets standard adhesion requirements even though the surface of the article has improved smoothness.

An aluminum container finished as described in Example V was coated with a UV curable ink design and coated with a UV curable polymer latex protective coating. After curing such coatings with UV light exposure, the coated container was cross-hatched with a razor through the coating and design to the metal's surface. Scotch 610 tape was applied to the surface of the container and was thereafter lifted off the container's surface. No coating or ink was lifted with the tape.

Thus, the coated container passed a standard industry adhesion test.

EXAMPLE VIII

This Example illustrates that containers treated in accordance with the present invention have better coating coverage characteristics for a given amount of coating than containers washed with conventional caustic washes.

A source of 12 ounce aluminum containers were produced in a conventional container bodymaker using coolants and a synthetic lubricant having the composition identified in Table 6.

TABLE 6

| Lubricant Composition | |
|---|---|
| | Volume % |
| tetraester[1] | 86 |
| S-MAZ 80[2] | 6 |
| BRIJ-30[2] | 4 |
| Mazon 224-86[2] | 2 |
| Mazon RI 6[3] | 2 |

[1]The tetraester is an ester prepared by esterification of a 10-30 carbon saturated fatty acid with a penta-erythritol.
[2]S-MAZ 80, BRIJ-30 and Mazon 224-86 are commercially available surfactants from Mazer Chemical.
[3]Mazon RI 6 is a commercially available anti-rust component from Mazer Chemical.

A first group of forty containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of forty containers produced as described above were finished with a 10% solution of 97 volume percent d-limonene, 6 volume percent Tergitol NP-7, and 1 volume percent WRS-1-66 at a wash solution temperature of 140° F. After washing, the containers were thoroughly rinsed with water. A third group of forty additional containers were finished with a 10 volume percent d-limonene solution, as described above, with a wash solution temperature of 120° F. The wash solution for this third group of containers started gelling and became the consistency of hand cream. The experiment was stopped and the bath was allowed to sit overnight during which time it liquified. The next day, a fourth group of forty containers were washed in the same 10 volume percent d-limonene based finishing solution at 120° F. This fourth group of containers had been allowed to sit overnight after manufacture and before cleaning. As noted below, the poor results obtained with this fourth group of containers are believed to be due to the containers not being finished immediately after manufacture, thus allowing lubricants and coolants to dry on the surface of the containers and preventing complete washing of the surface.

After finishing the containers, all four groups of containers were coated on the interior of the containers with a water-based epoxy coating available from Glidden having 20 volume percent solids, 64 volume percent water, and 16 volume percent volatile organic compounds. Each container was coated with 85 milligrams of the epoxy-based resin. After curing of the composition, each container was tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (85 milligrams), a lower current indicates better coverage. The results are shown below in Table 7.

TABLE 7

COMPARISON OF ERR VALUES BETWEEN TERPENE-BASED AND CAUSTIC-BASED FINISHING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 68 |
| 2 | Terpene | 140 | 13 |
| 3 | Terpene | 120 | 17 |
| 4 | Terpene | 120 | 73* |

*As noted above, this value is believed to be inaccurate because the containers which formed the basis of this value sat overnight after manufacture and before cleaning with the terpene-based solution, thus allowing lubricants and coolants to dry and harden.

Example VIII illustrates that, for a given amount of coating, containers finished with a terpene finishing agent have significantly better ERR values. This Example also shows that to obtain a given ERR value, a reduced amount of coating is required when metal containers have been finished with a terpene finishing agent.

EXAMPLE IX

This Example illustrates that containers treated in accordance with the present invention have better coating coverage characteristics for a given amount of coating than containers washed with conventional caustic washes.

A source of 12 ounce aluminum containers were produced in a conventional container bodymaker using the commercially available coolants and a synthetic lubricant Quaker 990 AB lubricant and Bodymaker DTI 5600 coolant. A first group of 350 containers produced as described above were washed in a 140° F. wash of a conventional caustic cleaner available from Amchem-Parker and identified as Amchem-Parker Can Washing Caustic Cleaner. After washing, the containers were thoroughly rinsed with water. A second group of 350 containers produced as described above were cleaned with a 10% solution of 97 volume percent d-limonene, 6 volume percent Tergitol NP-7, and 1 volume percent WRS-1-66 at a wash solution temperature of 120° F. After washing, the containers were thoroughly rinsed with water. A third group of 350 additional containers produced as described above were cleaned with a 5 to 8 volume percent d-limonene solution in water, without surfactants with a wash solution temperature of 120° F.

After cleaning, all three groups of containers were coated on the interior of the containers with a water-based epoxy coating available from Glidden having 20 volume percent solids, 64 volume percent water, and 16 volume percent volatile organic compounds. Each container was coated with 99 milligrams of the epoxy-based resin. After curing of the composition, 48 containers from each group were tested for the ability to conduct a current through the coating on the interior of the container using an enamel rater reading apparatus. In this test, a 1% sodium chloride solution is placed in the container and an electrode is placed in the sodium chloride solution. A second electrode is contacted to the outside of the container and a current is passed between the two electrodes. A higher current indicates a poorer coating because it indicates a reduced insulating ability of the coating. Thus, for a constant volume of coating applied to the containers (99 milligrams), a lower current indicates better coverage. The results are shown below in Table 8.

TABLE 8

COMPARISON OF ERR VALUES BETWEEN TERPENE-BASED AND CAUSTIC-BASED FINISHING SOLUTIONS AT CONSTANT COATING AMOUNTS

| Group # | Wash | Temperature (degrees Fahrenheit) | Average ERR (milliamps) |
|---|---|---|---|
| 1 | Caustic | 140 | 87.5 |
| 2 | Terpene | 120 | 3.0 |
| 3 | Terpene | 120 | 1.7 |

This Example illustrates that by cleaning containers with a terpene finishing agent, for a given amount of coating, significantly better coverage can be obtained as measured by ERR values. Alternatively, to obtain a given ERR value, lower amounts of coatings would be needed in the case of terpene-based cleaned containers.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is

1. A method for decorating a metal surface comprising:
   a) contacting a metal surface having oils thereon with a substantially neutral pH finishing agent to remove substantially all oils from said metal surface, where in said terpene-containing finishing agent does not substantially each said metal surface;
   b) applying a coating to said metal surface, whereby the amount of said coating necessary to coat said metal surface is reduced by at least about 18% as compared to the amount of coating necessary to coat a metal surface contacted with a finishing agent that does not have a substantially neutral pH.

2. The method as set forth in claim 1, wherein the roughness average of said metal surface is substantially the same before and after said step of contacting.

3. The method as set forth in claim 1, further comprising removing said finishing agent from said metal surface after said step of contacting.

4. The method as set forth in claim 1, wherein said coating is selected from the group consisting of protective coatings and decorative coatings.

5. The method as set forth in claim 1, wherein said metal surface is that of a metal container having interior and exterior surfaces and said coating is applied to said interior surface of said container.

6. The method as set forth in claim 1, wherein said metal surface is that of a metal container having interior and exterior surfaces and said coating is applied to said exterior surface of said container.

7. The method as set forth in claim 1 wherein after said step of contacting, said metal's surface is more reflective than a metal surface contacted with a finishing agent that does not have a substantially neutral pH.

8. The method as set forth in claim 1, further comprising rinsing said metal surface with water after said contacting step.

9. The method as set forth in claim 1, whereby said metal surface after said step of rinsing is substantially mirror-like in appearance.

10. The method as set forth in claim 1, wherein said coating is selected from the group comprising ink, paint or plastic.

11. The method as set forth in claim 1, wherein said metal has a thickness of less than about 10/1000 of an inch.

12. The method as set forth in claim 1, wherein said metal surface is that of a container.

13. The method as set forth in claim 1, wherein said finishing agent comprises 2% to about 40% by volume of a terpene.

14. The method as set forth in claim 1, wherein said terpene is selected from a group consisting of d-limonene, α-terpineol, β-terpineol, α-pinene, β-pinene, and alcohols thereof.

15. The method as set forth in claim 1, wherein the coating applied to said metal surface has adhesive characteristics similar to coatings applied to metal surfaces cleaned with a finishing agent that does not have a substantially neutral pH.

16. The method as set forth in claim 1, wherein the surface area of said metal surface after said contacting step is less than the surface area of a surface treated with a finishing agent that does not have a substantially neutral pH.

17. A method for coating metal surfaces having oils thereon, comprising:
a) contacting a metal surface with an effective amount of a terpene-containing finishing agent to substantially remove oils present on said metal surface, wherein said terpene-containing finishing agent does not substantially etch said metal surface; and
b) applying a coating to said metal surface, wherein the quantity of interior coating necessary to coat said metal surface is reduced by at least about 18% as compared to metal finished using a finishing agent that does not have a substantially neutral pH.

18. A method for coating metal surfaces having oils thereon, comprising:
a) contacting a metal surface with an effective amount of a terpene-containing finishing agent to substantially remove oils present on said metal surface, wherein said terpene-containing finishing agent does not substantially etch said metal surface; and
b) applying a coating to said metal surface, wherein said metal surface is that of a metal container having interior and exterior surfaces and said coating is applied to said exterior surface of said container, wherein the quantity of said exterior coating used is reduced by at least 37% as compared to metal finished using an acidic or caustic finishing agent.

19. A method for decorating a metal surface comprising finishing said metal surface with a terpene finishing agent wherein said finished metal surface has a roughness average of less than about 10.0 Ra before and after said step of finishing; and
applying a protective coating to said surface, wherein the quantity of said protective coating required to coat said surface is about 18% less than the quantity required to achieve desired coverage of a surface finished with an acidic or caustic finishing agent.

* * * * *